United States Patent
Thorpe et al.

(10) Patent No.: US 9,221,387 B1
(45) Date of Patent: Dec. 29, 2015

(54) BREAKAWAY HEADLAMP MOUNTING SYSTEM

(71) Applicant: GM GLOBAL TECHNOLOGY OPERATIONS LLC, Detroit, MI (US)

(72) Inventors: Scott W. Thorpe, Milford, MI (US); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/339,008

(22) Filed: Jul. 23, 2014

(51) Int. Cl.
B60Q 1/04 (2006.01)
B60R 21/34 (2011.01)
B62D 25/12 (2006.01)

(52) U.S. Cl.
CPC ............ B60Q 1/0483 (2013.01); B62D 25/12 (2013.01); B60R 21/34 (2013.01)

(58) Field of Classification Search
CPC ...... B60Q 1/04; B60Q 1/0408; B60Q 1/0433; B60Q 1/0483; B60Q 1/0491; B60R 21/34; B62D 25/00; B62D 25/08; B62D 25/12

USPC ........... 296/187.03, 187.04, 187.09, 193.03; 362/459, 487, 507, 549
See application file for complete search history.

(56) References Cited

U.S. PATENT DOCUMENTS

| | | | | |
|---|---|---|---|---|
| 6,450,676 B2 * | 9/2002 | Maeda et al. | ............... | 362/549 |
| 8,337,064 B2 * | 12/2012 | Yonezawa | ..................... | 362/549 |
| 2001/0022729 A1 * | 9/2001 | Maeda | ......................... | 362/487 |
| 2010/0067252 A1 * | 3/2010 | Schwab | ....................... | 362/549 |
| 2013/0088886 A1 * | 4/2013 | Eckert et al. | ................. | 362/528 |

FOREIGN PATENT DOCUMENTS

EP  1577160 A1 *  9/2005
FR  2901202 A1 *  11/2007

* cited by examiner

*Primary Examiner* — Jason S Daniels
(74) *Attorney, Agent, or Firm* — Quinn Law Group, PLLC

(57) ABSTRACT

A breakaway headlamp mounting system is provided for a vehicle subjectable to an external force and having a body structure, a headlamp, and a hood. The breakaway headlamp mounting system has a mounting tab attached to the headlamp and attachable to the body structure and a mounting tab breakaway feature included in one of the hood, the body structure, and the mounting tab. The mounting tab breakaway feature is configured to break the mounting tab in response to the external force when the mounting tab is attached to the body structure.

18 Claims, 4 Drawing Sheets

BREAKAWAY HEADLAMP MOUNTING SYSTEM

TECHNICAL FIELD

This disclosure relates to a breakaway headlamp mounting system for a vehicle.

BACKGROUND

A vehicle typically includes a hood and headlamps attached to a body structure. The headlamps may be attached to the body structure via mounting tabs. The vehicle hood and headlamps may be subjectable to an external force. It may be beneficial for the headlamps to break away from their mounting tabs when the hood and/or the headlamp is subjected to the external force.

SUMMARY

A breakaway headlamp mounting system is provided for a vehicle subjectable to an external force and having a body structure, a headlamp, and a hood. The breakaway headlamp mounting system has a mounting tab attached to the headlamp and attachable to the body structure and a mounting tab breakaway feature included in one of the hood, the body structure, and the mounting tab. The mounting tab breakaway feature is configured to break the mounting tab in response to the external force when the mounting tab is attached to the body structure.

A vehicle is also provided. The vehicle is subjectable to an external force and includes a body structure, a hood, a headlamp, and a breakaway headlamp mounting system. The hood is operatively connected to the body structure. The headlamp has a mounting tab connecting the headlamp to the body structure. The breakaway headlamp mounting system has a mounting tab breakaway feature included in one of the hood, the body structure, and the mounting tab. The mounting tab breakaway feature is configured to break the mounting tab connection to the body structure in response to the external force.

The breakaway headlamp mounting system and the vehicle enables the headlamps to break away from their mounting tabs when the hood and/or the headlamp is subjected to the external force.

The above features and advantages and other features and advantages of the present teachings are readily apparent from the following detailed description of the best modes for carrying out the present teachings when taken in connection with the accompanying drawings.

DETAILED DESCRIPTION

Figure 1:
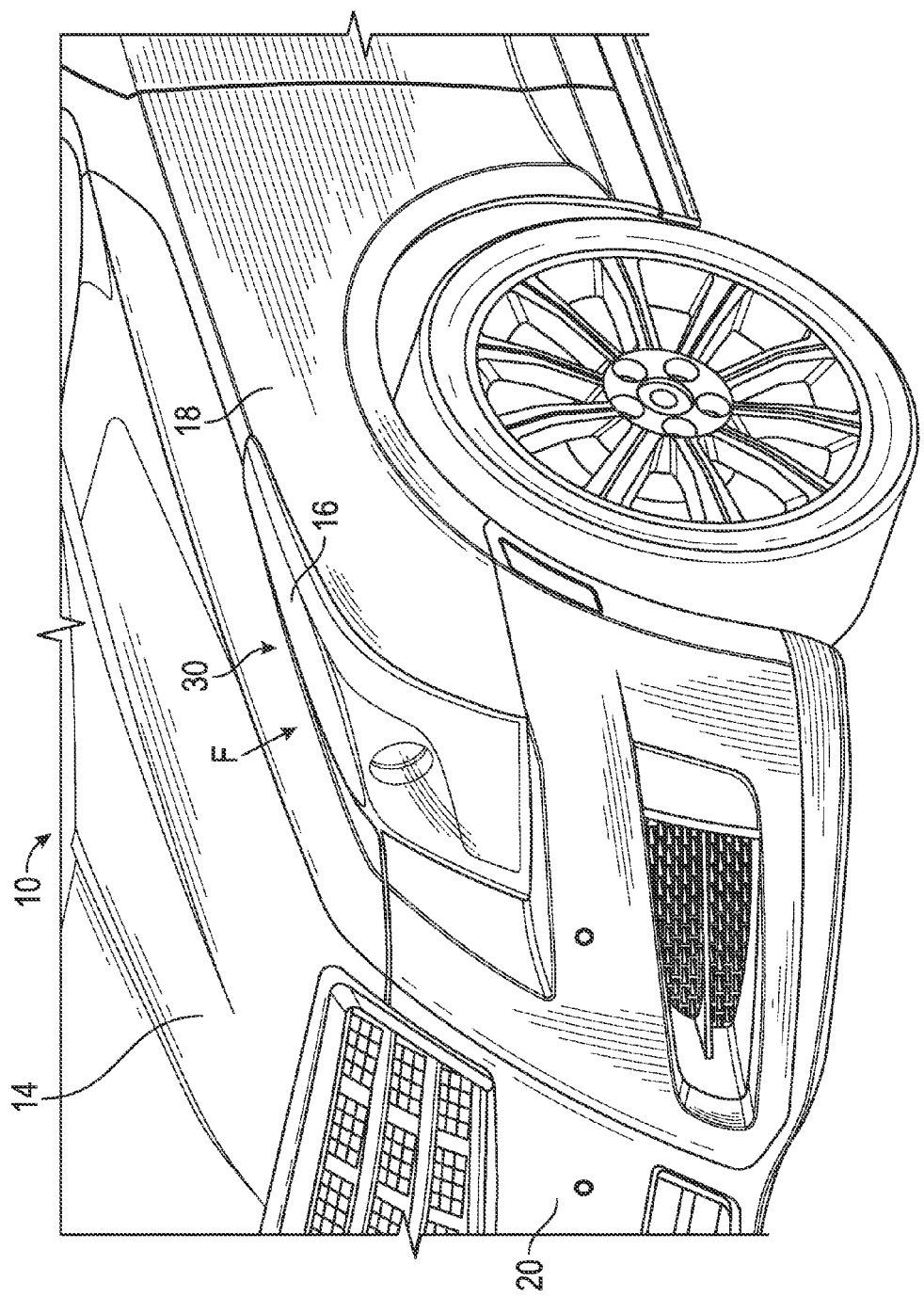
FIG. 1 is a fragmentary schematic perspective illustration of a vehicle having a breakaway headlamp mounting system.

Referring to the drawings, wherein like reference numbers refer to like components throughout the views, FIG. 1 shows a vehicle 10 subjectable to an external force F event. The vehicle 10 includes a body structure 12 (best seen in FIG. 2), a hood 14 operatively connected to the body structure 12, a headlamp 16, and a breakaway headlamp mounting system 30. The hood 14 may be operatively connected to the body structure 12 via hinges (not shown) and a latch (not shown) or via any other suitable connection. The vehicle 10 may also include a fender 18. The external force F may act on one or both of the hood 14, as shown, and the headlamp 16 (best seen in FIG. 2). The external force F event does not occur during normal vehicle operation. Rather, the external force F event only occurs in special circumstances.

Figure 2:
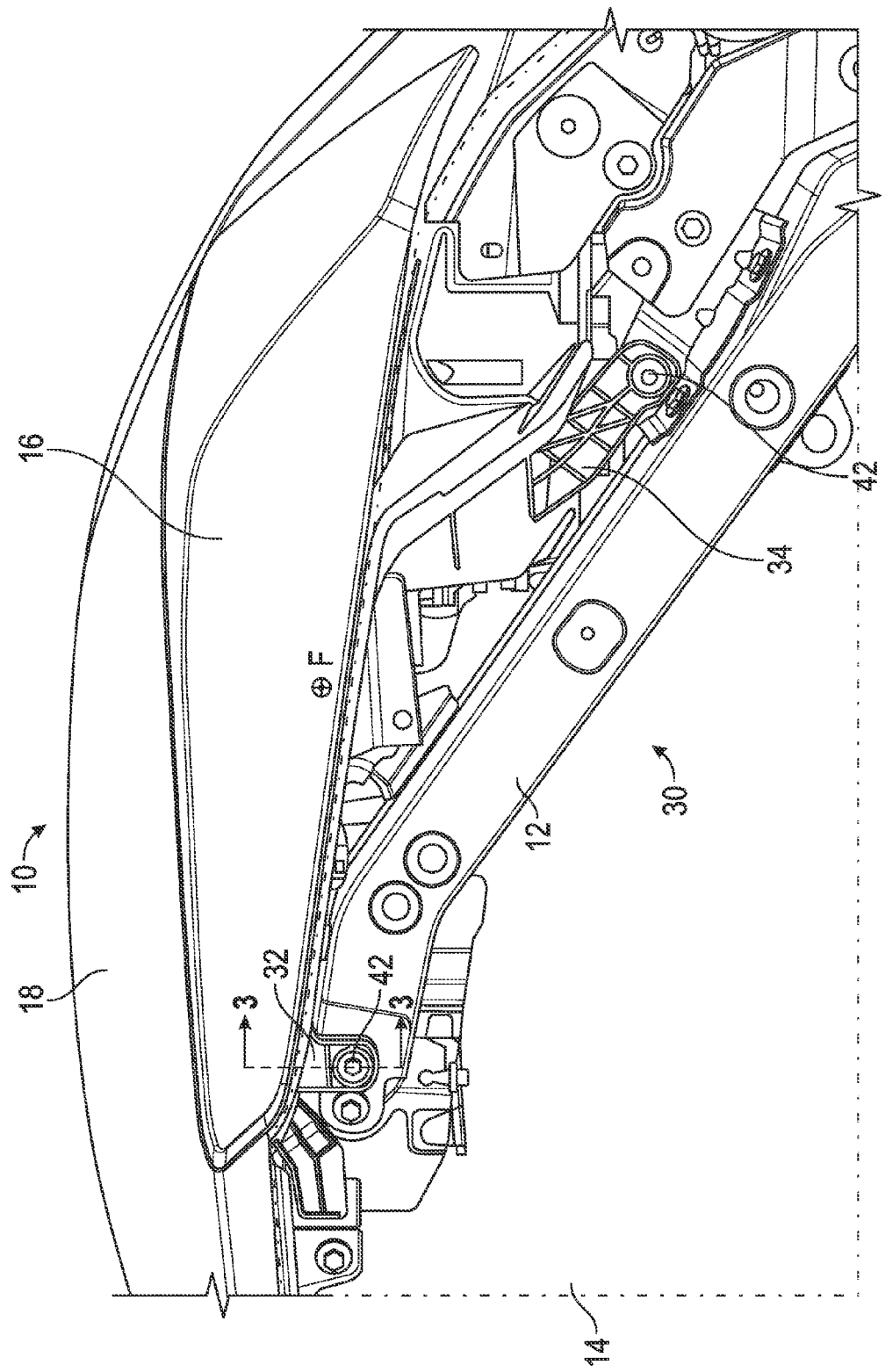
FIG. 2 is a fragmentary schematic top view illustration of the vehicle of FIG. 1 with the hood in phantom, showing the breakaway headlamp mounting system.

Referring now to FIG. 2, the breakaway headlamp mounting system 30 includes a mounting tab 32 attached the headlamp 16 and to the body structure 12 via a fastener 42 or via any other suitable attachment. The breakaway headlamp mounting system 30 may include a second mounting tab 34 attached to the headlamp 16 and to the body structure 12. The breakaway headlamp mounting system 30 may include additional mounting tabs (not shown) attached to the headlamp 16 and to the body structure 12. The mounting tabs 32, 34 may be made of a filled or unfilled non-metal material. The mounting tabs 32, 34 may be molded or may be formed by any other suitable process.

Figure 3:
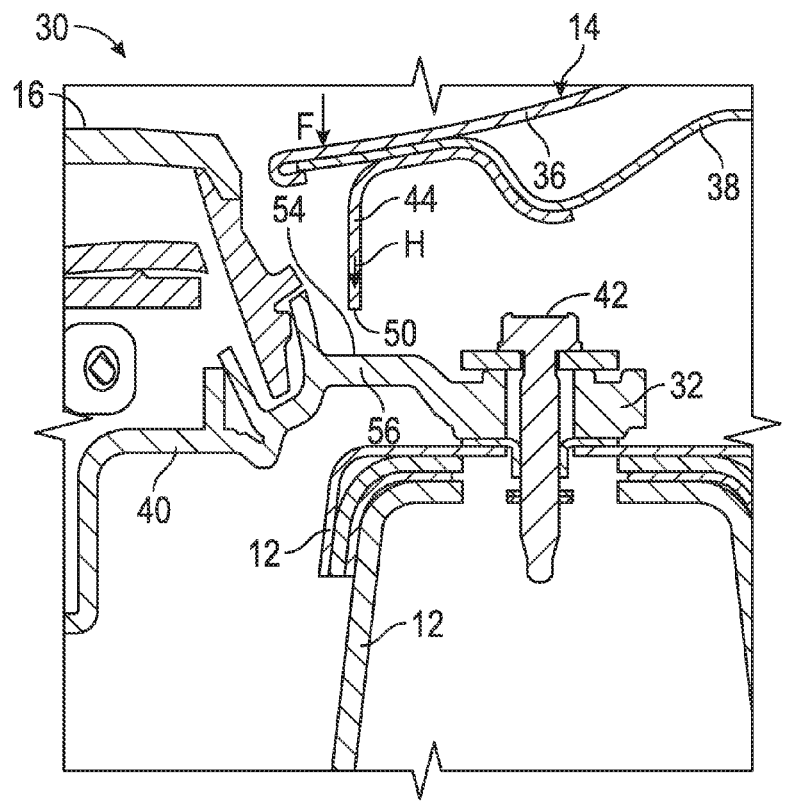
FIG. 3 is a schematic cross-sectional illustration of an embodiment of the breakaway headlamp mounting system of FIG. 2 taken at line 3-3 of FIG. 2.

Referring now to FIG. 3, the headlamp 16 may include a housing 40. The mounting tab 32 may be part of the housing 40 or may be a separate part attached to the housing 40. The breakaway headlamp mounting system 30 includes a mounting tab breakaway feature which may be configured as hood mounted hammer 44 included in the hood 14. The hood 14 may include a hood outer panel 36 and a hood inner panel 38 attached to the hood outer panel 36. The hood mounted hammer 44 may be attached to the hood inner panel 38. The hood mounted hammer 44 includes an end 50. The end 50 may be configured as a rectangular shape, as shown, or may be pointed, rounded, or any other suitable configuration.

The hood mounted hammer 44 is configured to break the mounting tab 32 connection to the body structure 12 in response to the external force F. When the external force F is applied to the hood 14, the hood 14 deforms and the hood mounted hammer end 50 contacts the mounting tab 32 at a contact location 54. The hood mounted hammer 44 applies a hammer force H to the mounting tab 32, causing the mounting tab 32 to be stressed and to break at a break area 56. The break area 56 is configured to provide appropriate structural performance under normal operating conditions and may be configured to break with little or no plastic deformation in response to the external force F. The break area 56 may be configured to fracture at a predetermined force level. The second mounting tab 34 (shown in FIG. 2) and other mounting tabs (not shown) may be similarly configured.

Figure 4:
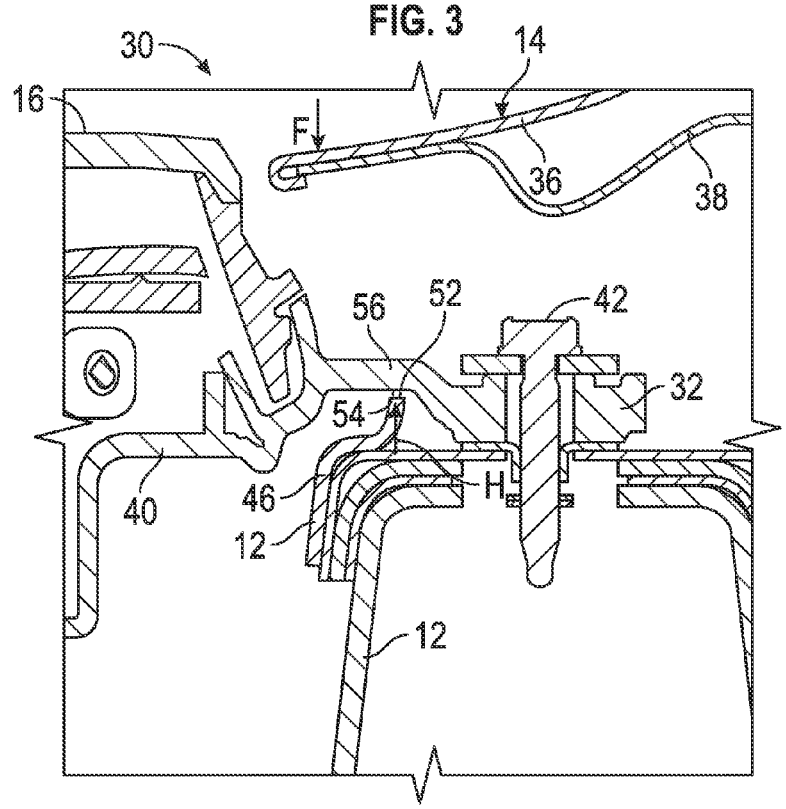
FIG. 4 is a schematic cross-sectional illustration of another embodiment of the breakaway headlamp mounting system of FIG. 2 taken at line 3-3 of FIG. 2.

Referring now to FIG. 4, another embodiment of the breakaway headlamp mounting system 30 has a mounting tab breakaway feature configured as a body structure mounted hammer 46 included in the body structure 12. The body structure mounted hammer 46 includes an end 52. The end 52 may be configured as a rectangular shape, as shown, or may be pointed, rounded, or any other suitable configuration.

The body structure mounted hammer 46 is configured to break the mounting tab 32 connection to the body structure 12 in response to the external force F. When the external force F is applied to the hood 14, the hood 14 deforms to contact the headlamp housing 40, causing the mounting tab 32 to deform or bend. When the mounting tab 32 deforms or bends, the body structure mounted hammer 46 applies a hammer force H to the mounting tab 32 at contact location 54, causing the mounting tab 32 to be stressed and to break at the break area 56.

Similarly, when the external force F is applied to the headlamp 16, the headlamp mounting tab 32 deforms or bends. When the headlamp mounting tab 32 deforms or bends, the body structure mounted hammer 46 applies a hammer force H to the mounting tab 32 at contact location 54, causing the headlamp mounting tab 32 to be stressed and to break at the break area 56.

The break area 56 is configured to provide appropriate structural performance under normal operating conditions and may be configured to break with little or no plastic deformation in response to the external force F. The break area 56 may be configured to fracture at a predetermined force level. The second headlamp mounting tab 34 (shown in FIG. 2) and other headlamp mounting tabs (not shown) may be similarly configured.

Figure 5:
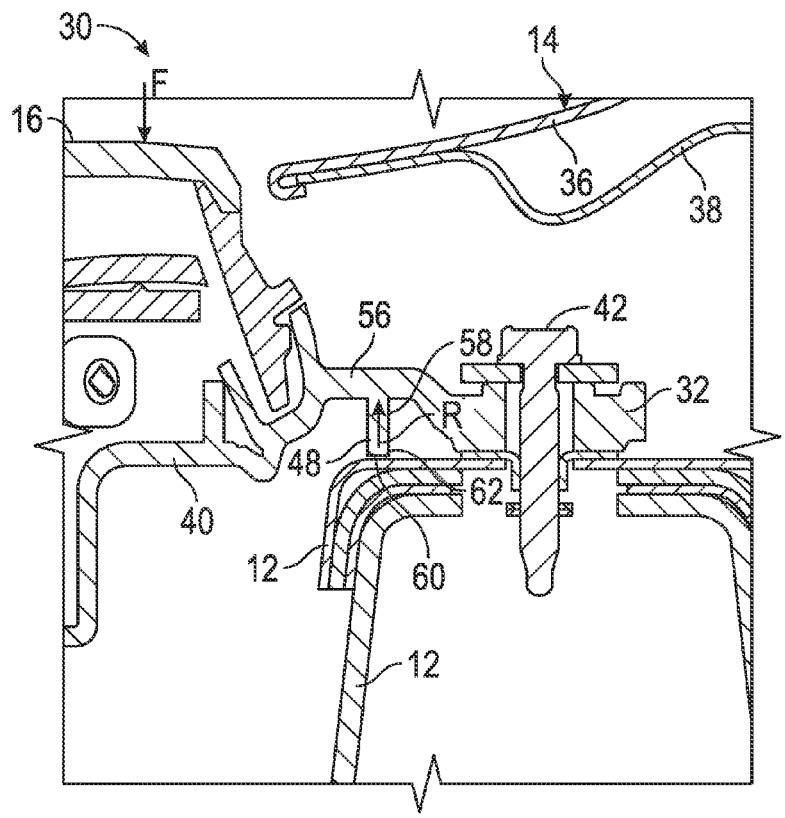
FIG. 5 is a schematic cross-sectional illustration of another embodiment of the breakaway headlamp mounting system of FIG. 2 taken at line 3-3 of FIG. 2.

Referring now to FIG. 5, another embodiment of the breakaway headlamp mounting system 30 has a mounting tab breakaway feature configured as a mounting tab break initiating feature 48. The mounting tab break initiating feature 48 may be a rib or a boss 58 formed on the headlamp mounting tab 32. The rib or boss 58 has an end 60. The end 60 may be configured as a rectangular shape, as shown, or may be pointed, rounded, or any other suitable configuration. The mounting tab break initiating feature 48 is configured to break the mounting tab 32 connection to the body structure 12 in response to the external force F. When the external force F is applied to the hood 14, the hood 14 deforms to contact the headlamp housing 40, causing the mounting tab 32 to deform or bend. When the mounting tab 32 deforms or bends, the mounting tab break initiating feature 48 contacts the body structure 12 at a body structure contact location 62 and applies a rib force R to the mounting tab 32, causing the mounting tab 32 to be stressed and to break at the break area 56.

Similarly, when the external force F is applied to the headlamp 16, the mounting tab 32 deforms or bends. When the mounting tab 32 deforms or bends, the mounting tab break initiating feature 48 contacts the body structure 12 at the body structure contact location 62 and applies a rib force R to the mounting tab 32, causing the mounting tab 32 to be stressed and to break at the break area 56.

The break area 56 is configured to provide appropriate structural performance under normal operating conditions and may be configured to break with little or no plastic deformation in response to the external force F. The break area 56 may be configured to fracture at a predetermined force level. The second mounting tab 34 (shown in FIG. 2) and other headlamp mounting tabs (not shown) may be similarly configured.

Figure 6:
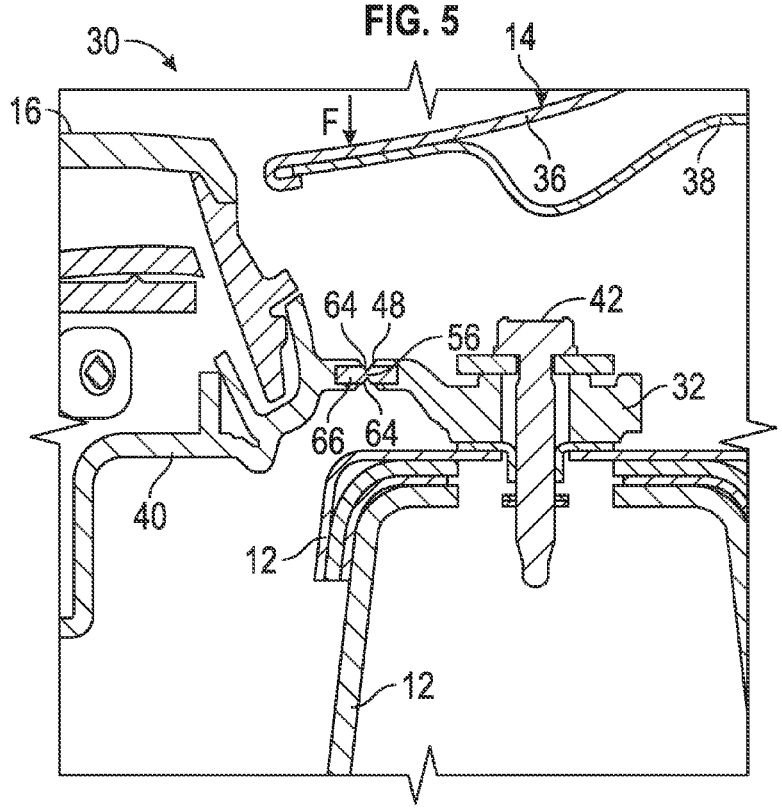
FIG. 6 is a schematic cross-sectional illustration of another embodiment of the breakaway headlamp mounting system of FIG. 2 taken at line 3-3 of FIG. 2.

Referring now to FIG. 6, the mounting tab break initiating feature 48 may be a notch or cutout 64 formed in the mounting tab 32. The notch or cutout 64 may be formed in both sides of the mounting tab 32, as shown, or may be formed in only one side of the mounting tab 32 (not shown). The notch or cutout 64 may be V-shaped, as shown, or may be any other suitable shape. When the external force F is applied to the hood 14, the hood 14 deforms to contact the headlamp housing 40, causing the mounting tab 32 to deform or bend. When the mounting tab 32 deforms or bends, the notch or cutout 64 is stressed and initiates a break in the mounting tab 32, causing the mounting tab 32 to break at the break area 56.

Similarly, when the external force F is applied to the headlamp 16, the headlamp mounting tab 32 deforms or bends. When the mounting tab 32 deforms or bends, the notch or cutout 64 is stressed and initiates a break in the headlamp mounting tab 32, causing the mounting tab 32 to break at the break area 56.

The break area 56 is configured to provide appropriate structural performance under normal operating conditions and may be configured to break with little or no plastic deformation in response to the external force F. The break area 56 may be configured to fracture at a predetermined force level. The second mounting tab 34 (shown in FIG. 2) and other headlamp mounting tabs (not shown) may be similarly configured.

Continuing with FIG. 6, another embodiment of the breakaway headlamp mounting system 30 has a mounting tab breakaway feature configured as a break initiating insert 66 included in the mounting tab 32. The break initiating insert 66 includes a break area 56 that is configured to provide appropriate structural performance under normal operating conditions and may be configured to break with little or no plastic deformation in response to the external force F. The break initiating insert 66 may be configured to fracture at a predetermined location and at a predetermined force level. The break initiating insert 66 may be made of a metal or of a non-metal. The break initiating insert 66 may be formed by casting, molding, or by any other suitable method. The break initiating insert 66 may form a crack initiator such as a notch or cutout 64. The notch or cutout 64 may be formed in both sides of the break initiating insert 66, as shown, or may be formed in only one side of the break initiating insert 66 (not shown). The notch or cutout 64 may be V-shaped, as shown, or may be any other suitable shape.

The break initiating insert 66 may be co-molded in the headlamp mounting tab 32. Co-molding may include sequential molding of a first material for the mounting tab 32 and a second material for the break initiating insert 66. Co-molding may include over-molding the first material for the mounting tab 32 over a previously formed break initiating insert 66 made of the second material. Alternatively, the break initiating insert 66 may be attached to the headlamp mounting tab 32 via a fastener, an adhesive bond, or via any other suitable attachment.

When the external force F is applied to the hood 14, the hood 14 deforms to contact the headlamp housing 40, causing the mounting tab 32 to deform or bend. When the mounting tab 32 deforms or bends, the break initiating insert 66 in the mounting tab 32 is stressed and breaks at the break area 56.

Similarly, when the external force F is applied to the headlamp 16, the mounting tab 32 deforms or bends. When the mounting tab 32 deforms or bends, the break initiating insert 66 is stressed and breaks at the break area 56. The second mounting tab 34 (shown in FIG. 2) and other headlamp mounting tabs (not shown) may be similarly configured.

The various embodiments of the breakaway headlamp mounting system 30 and the various mounting tab 32 breakaway features 44, 46, 48, 58, 64, 66 shown in FIGS. 3-6 may used in combination with one another in a variety of ways. For example, the body structure hammer 46 of FIG. 4 may be used in combination with the notch or cutout 64 of FIG. 6. Or, the rib or boss 58 of FIG. 5 may be used in combination with the break initiating insert 66 of FIG. 6. Other combinations are possible.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A breakaway headlamp mounting system for a vehicle subjectable to an external force and having a body structure, a headlamp, and a hood, the breakaway headlamp mounting system comprising:
   a mounting tab attached to the headlamp and attachable to the body structure; and
   a mounting tab breakaway feature included in one of the hood, the body structure, and the mounting tab and configured to break the mounting tab in response to the external force when the mounting tab is attached to the body structure;
   wherein the mounting tab breakaway feature includes a break initiating insert in the mounting tab.

2. The breakaway headlamp mounting system of claim 1, wherein the mounting tab breakaway feature includes a hammer feature included in the hood.

3. The breakaway headlamp mounting system of claim 2, wherein the mounting tab breakaway feature includes a break initiating feature in the mounting tab.

4. The breakaway headlamp mounting system of claim 1, wherein the mounting tab breakaway feature includes a hammer feature included in the body structure.

5. The breakaway headlamp mounting system of claim 4, wherein the mounting tab breakaway feature includes a break initiating feature in the mounting tab.

6. The breakaway headlamp mounting system of claim 1, wherein the mounting tab breakaway feature includes a break initiating feature in the mounting tab.

7. The breakaway headlamp mounting system of claim 1, wherein the mounting tab is a molding and the break initiating insert is co-molded to the mounting tab.

8. The breakaway headlamp mounting system of claim 1, wherein the break initiating insert is a metal.

9. The breakaway headlamp mounting system of claim 1, wherein the break initiating insert is a non-metal.

10. A vehicle subjectable to an external force, comprising:
    a body structure;
    a hood operatively connected to the body structure;
    a headlamp having a mounting tab connecting the headlamp to the body structure; and
    a breakaway headlamp mounting system having a mounting tab breakaway feature including a hammer feature attached to and extending from the hood and having an end configured to contact and break the mounting tab in response to the external force.

11. The vehicle of claim 10, wherein the mounting tab breakaway feature includes a hammer feature included in the body structure.

12. The vehicle of claim 10, wherein the mounting tab breakaway feature includes a break initiating feature in the mounting tab.

13. The vehicle of claim 10, wherein the mounting tab breakaway feature includes a break initiating insert in the mounting tab.

14. The vehicle of claim 13, wherein the mounting tab is a molding and the break initiating insert is co-molded to the mounting tab.

15. The vehicle of claim 13, wherein the break initiating insert is a metal.

16. A vehicle subjectable to an external force, comprising:
    a body structure;
    a hood operatively connected to the body structure;
    a headlamp having a mounting tab connecting the headlamp to the body structure; and
    a breakaway headlamp mounting system having a mounting tab breakaway feature including a hammer feature attached to and extending from the body structure and having an end configured to contact and break the mounting tab in response to the external force.

17. The vehicle of claim 16, wherein the mounting tab breakaway feature includes a break initiating feature in the mounting tab.

18. The vehicle of claim 16, wherein the mounting tab breakaway feature includes a break initiating insert in the mounting tab.

* * * * *